Dec. 18, 1962

B. M. LIDE ET AL 3,069,545

METHOD AND APPARATUS FOR DETERMINING THE STATE OF A NUCLEAR REACTOR

Filed Feb. 28, 1958

| MA1 | | |
|---|---|---|
| TERM | TURNS | DCR |
| 1-2 | 3500 | 112 |
| 3-5 | 2200 | 332 |
| 6-8 | 500 | 75 |
| 9-12 | 1600 | 88 |

Fig. 5D.

| MA2 | | | MA3 | | |
|---|---|---|---|---|---|
| TERM | TURNS | DCR | TERM | TURNS | DCR |
| 1-2 | 1800 | 108 | 1-2 | 5000 | 103 |
| 3-4 | 3000 | 1240 | 3-4 | 2000 | 835 |
| 5-6 | 3000 | 1300 | 5-6 | 2000 | 845 |
| 7-8 | 2000 | 930 | 7-8 | 800 | 179 |
| 9-10 | 200 | 100 | | | |
| 11-12 | 100 | 26 | | | |

WITNESSES:
Bernard R. Giegug
Robert C. Baird

INVENTORS
Basil M. Lide and
Nyle E. Bush.
BY
Hymen Diamond.
ATTORNEY

United States Patent Office 3,069,545
Patented Dec. 18, 1962

3,069,545
METHOD AND APPARATUS FOR DETERMINING THE STATE OF A NUCLEAR REACTOR
Basil M. Lide, Pittsburgh, and Nyle E. Bush, Forest Hills, Pa., assignors to Westinghouse Electric Corporation, East Pittsburgh, Pa., a corporation of Pennsylvania
Filed Feb. 28, 1958, Ser. No. 718,328
23 Claims. (Cl. 250—83.1)

This invention relates to the art of measuring electrical quantities and has particular relation to the measurements of neutron flux for the purpose of determining the state of a nuclear reactor. In its specific aspects, this invention concerns itself with apparatus including amplifier valves and particularly with amplifiers having a broad linear range.

Since improper operation of a nuclear reactor may result in a serious catastrophe, it is essential that precise and highly reliable apparatus be provided to determine the state of a reactor so that while the reactor is still at a low power level, measures to prevent a catastrophe can be taken. It is an object of this invention in its broadest aspects to provide such apparatus.

The transient state of a nuclear reactor is determined by measuring the time rate-of-change of the neutron flux developed in the reactor. An indication of the neutron flux at any instant present in a reactor is obtained by a neutron-flux measuring unit which may take the form of an ionization chamber which conducts current substantially proportional to the instantaneous neutron flux. Since the neutron flux may vary over a range of a number of decades as the nuclear reactor is going critical, it is desirable that the magnitude measured be observed on a logarithmic rather than on an arithmetic scale. Provision is then made for connecting the parameter of the flux measuring apparatus (usually the current) into a parameter (usually voltage) substantially proportional to the logarithm of the flux measurement. In determining the state of a reactor, particularly at low power levels, the important parameter is not the magnitude or level of the flux, but the rate at which the flux is changing, and provisions are included for observing the differential of the parameter proportional to the logarithm of the magnitude of the flux.

Apparatus for indicating the state of a nuclear reactor then essentially includes a neutron flux measuring unit, a device for converting the flux parameter into the logarithm of this parameter which is called a log-level amplifier, and a differentiating device called a period amplifier. The input to the period amplifier includes a differentiating network consisting of a capacitor and resistors. The state of the nuclear reactor is determined by observing the output of the period amplifier. If the rate-of-change indicated is excessively high, the operation of the reactor must be stopped. This is usually accomplished by inserting control rods into the reactor so as to reduce materially the production of neutrons. Since the proper and safe operation of a nuclear reactor depends on the flux measuring apparatus, it is indispensable that at all times the operators of the nuclear reactor be certain that the indications of the flux measuring apparatus are correct. It is then necessary that the flux measuring apparatus be calibrated repeatedly at reasonable intervals.

It is then broadly an object of this invention to provide flux measuring apparatus which shall include facilities for readily calibrating this apparatus and, it is a further object of this invention to provide a method for readily calibrating the flux measuring apparatus.

In calibrating flux measuring apparatus in accordance with the teachings of the prior art, a signal of known magnitude and form is impressed either at the input of the log-level amplifier or at the input of the period amplifier and the response of either or both amplifiers is observed. The former practice requires that an exponential potential varying with respect to time in a predetermined known manner be impressed on the input of the log-level amplifier, and the latter practice requires that a potential varying linearly with respect to time be impressed on the input to the period amplifier. Both methods involve precise adjustment of generator equipment of one type or another to assure that the calibrating signal is of the proper magnitude and precise test meters must be provided. The setting up of the calibrating signal in the practice of both methods is also highly time-consuming and the facility for ready calibrations is not available. In calibrating with a signal impressed on the log-level amplifier, a capacitor-resistor network is used to provide the signal; such a network is capable of covering only a small fraction of the total range. In the practice of the other method the potential impressed on the input of the period amplifier is derived from a motor-driven potentiometer. In this case, difficulty is encountered in restoring the capacitor or the differentiating network to its measuring condition within a reasonably short time interval after the calibration.

It is then an object of this invention to provide neutron flux measuring apparatus including facilities for calibrating this apparatus which shall permit calibration without the use of externally impressed calibrating signals.

Another object of this invention is to provide a method of calibrating neutron flux measuring apparatus in the practice of which the impressing of an external calibrating signal shall not be required.

An incidental object of this invention is to provide novel flux measuring apparatus.

It is a further incidental object of this invention to provide flux measuring apparatus including a minimum of electronic discharge tubes which shall nevertheless have a stability with respect to drift and with respect to variations in the supply potentials at least as satisfactory as electronic apparatus including a large number of electronic tubes and supplied from a regulated source.

This invention in its specific aspects arises from the discovery that the relationships of the potentials impressed on certain of the components of neutron-flux measuring apparatus can be so set by the proper construction of this apparatus that on the switching of certain of the electrodes of the valves included in the apparatus, a calibrating signal becomes available within the apparatus itself which can serve to calibrate this apparatus. The apparatus with which this invention concerns itself includes a log-level amplifier and a period amplifier interconnected through a differentiating network. Meters are connected to the respective outputs of the log-level and the period amplifiers for measuring respectively the logarithm of the level of the neutron flux and the rate-of-change of this logarithm. The former meter may be calibrated in terms of decades of neutron flux. The log-level amplifier includes an input valve which in the preferred practice of this invention is a discharge device, but which may also be a transistor or even a saturable reactor unit such as a magnetic amplifier. There is a negative feedback connection between the output of the period amplifier and its input which assures that substantially the whole potential drop of the signal impressed on the period amplifier through the differentiating network exists across the capacitor of the network.

In the use of this apparatus for measurement of neutron flux, the cathode of the input valve of the log-level amplifier is connected to ground or other reference potential, and a signal potential proportional to the logarithm of the neutron flux derived from the flux measuring unit is impressed between the control electrode and the cathode. The meter at the output of the period amplifier then measures the rate-of-change of this signal and indicates the transient state of the nuclear reactor.

In accordance with this invention, the cathode of this input valve is connected through a variable impedance means, preferably a variable resistor to the output of the period amplifier. The cathode is also connected to a potential supply. In addition, selectively operable switch means is provided for disconnecting the cathode from ground during calibration.

When during the calibrating operation, the cathode of the input valve, is disconnected from ground, the log-level amplifier is cathode driven and its output potential changes. The connection between the output of the period amplifier and the cathode of the input valve sets up a negative feedback which tends to return the cathode to ground potential thus compensating for the variation in the output of the log-level amplifier. The effect of this operation is to impress a potential which varies as a linear function of time on the differentiating network. The feedback variable resistor may be set so that the meter at the output of the period amplifier has a predetermined reading corresponding to a predetermined rate. The indication of the meter at the output of the log-level amplifier indicates the change in the potential which is charging the differentiating network. This potential changes linearly. The variation in the indication of this meter corresponds to a change in neutron flux over a predetermined time interval. As the indication varies from a magnitude corresponding to a starting neutron flux to a magnitude corresponding to a higher or lower neutron flux (usually higher), the time taken for the variation may be determined by a timer of one type or another such as a stop-watch. The part of the resistance of the differentiating network that is in the negative feedback circuit between the output and the input of the period amplifier is now set so that the rate of rise as measured by the timer watch has the desired magnitude. With the period amplifier meter set correspondingly to give a predetermined indication for this set variation of the indication of the log-level meter, the rate-of-change of neutron flux for the set indication of the period amplifier meter is known, and thus in the operation of the apparatus following a calibrating operation as just described, the variation of the neutron flux may be determined from the period amplifier meter.

In accordance with another aspect of this invention highly stable apparatus for determining the neutron flux is provided. This apparatus includes a log-level amplifier including a logarithmic pentode as an input valve which is cascaded with a magnetic amplifier. The log-level amplifier is coupled through a differentiating network which includes two magnetic amplifiers in cascade. The control circuit of the pentode is supplied directly from the neutron flux measuring unit.

The novel features considered characteristic of this invention are disclosed generally above. The invention itself both as to its organization and as to its method of operation, together with additional objects and advantages thereof, will be understood from the following description of specific embodiments taken in connection with the accompanying drawings in which:

FIGS. 3 and 5A, 5B, 5C and 5D are presented only for the purpose of aiding those skilled in the art in practicing this invention, and not with any intention of in any way restricting this invention.

Figure 1:
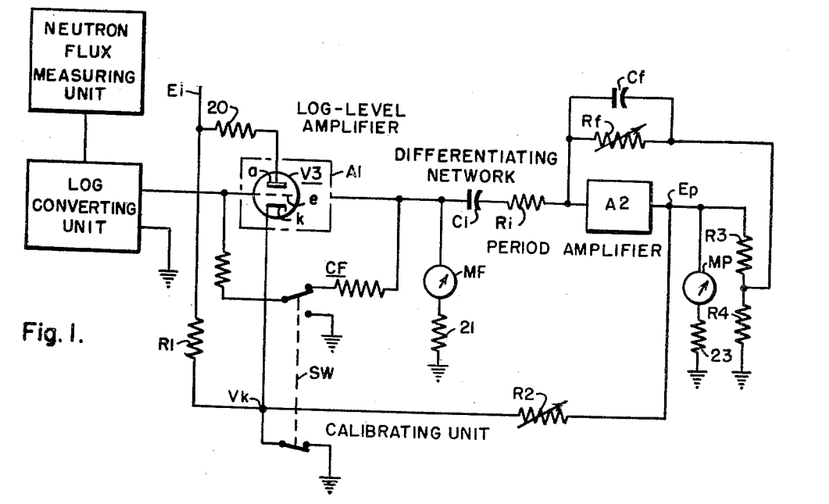
FIGURE 1 is a diagrammatic view showing the essential features of this invention.

The apparatus shown in FIG. 1 includes a Neutron Flux Measuring Unit, and a Log Converting Unit connected to the Measuring Unit for converting the signal of the latter which is proportional to the Neutron Flux into a signal proportional to the logarithm of the Neutron Flux. In addition, the FIG. 1 apparatus includes a Log-Level Amplifier, A1, a Period Amplifier, A2, a Differentiating Network, and a Calibrating Unit. During calibration the Amplifier A1 operates in reverse phase to Amplifier A2; that is, during calibration the connections are such that a signal of one polarity at the input of Amplifier A1 would produce a signal of the same polarity at the input of Amplifier A2 which in turn would produce a signal of the opposite polarity at the output of A2. The apparatus is supplied with power from a supply having a pole $Ei$ positive relative to ground and includes a switch SW for setting the apparatus for operation or calibration. This invention is illustrated in FIG. 1 in its most rudimentary form. In the actual practice of the invention, the concepts disclosed in FIG. 1 are embodied in electrical circuit apparatus including valves of which may be of different types.

The Flux Measuring Unit may be of any type available in the art, and usually includes an ionization chamber which produces a current proportional to the Neutron Flux in the region being measured. The Flux Measuring Unit is usually disposed in the nuclear reactor in a position such as to sense effectively the state of the reactor. The Log Converting Unit may be any device capable of producing at its output a potential proportional to the logarithm of the current signal produced by the Flux Measuring Unit. The conversion may be effected by a diode or even by the control-grid-cathode circuit of a tube. It is essential that the conversion be precise over the wide range of variation of the Neutron Flux. This range usually extends over an interval of at least six decades, that is, over a range of variation such that the maximum Neutron Flux is one million times the minimum Neutron Flux. The Log-Level Amplifier A1 is a direct-current amplifier connected to operate linearly over a wide range of signal inputs. This Amplifier includes an input valve V3 having an anode $a$, a control electrode $e$ and a cathode $k$ (in the case of a transistor, a base, a collector and an emitter). The anode $a$ is connected to the pole $Ei$ through an anode resistor 20. The output of the Log Converting Unit is adapted to be connected between the control electrode $e$ and the cathode $k$ in the operating setting of the apparatus. To stabilize the operation of the Amplifier A1, a negative feedback connection CF is provided between the output and the input of the Amplifier A1. In the operating setting of the apparatus, the cathode $k$ is adapted to be connected to ground and the negative feedback network CF is adapted to be closed through the switch SW.

The output of the Amplifier A1 is connected to ground through a meter or instrument MF and a resistor 21. This instrument may be calibrated in neutron flux decades so that its indications correspond to the neutron flux being measured.

The Differentiating Network includes a capacitor $Ci$, and a resistor $Ri$ of relatively small magnitude and a resistor R$f$. The resistor R$f$ is shunted by a capacitor C$f$. The output of Amplifier A1 is connected to the input of Amplifier A2 through the capacitor C$i$ and the resistor R$i$. The capacitor C$f$ and the resistor R$i$ constitutes a time-constant network which operates to suppress transients.

The Period Amplifier A2 is a direct-current amplifier capable of producing a precise response to the input signal. The output of Amplifier A2 is connected to its input through a feedback circuit including the network C$f$—R$f$ and a resistance divider network consisting of resistors R3 and R4. The Differentiating Network C$i$—R$f$ is thus connected to the output of Amplifier A2. The feedback network through C$f$—R$f$ operates to maintain the potential of the input of A2 substantially constant so that the drop of any signal impressed from the output of Amplifier A1 appears substantially entirely across capacitor C$i$, resistor R$i$ being relatively small. A signal corresponding to the differential of the signal impressed on the Differentiating Network, appears across the output of A2. To measure the magnitude of this signal, a meter or instrument MP is connected between the output and ground through a resistor 23.

The Calibrating Unit includes, a variable resistor R2 connected between the cathode $k$ and the output of the Amplifier A2. The cathode $k$ is also connected to the positive pole E$i$ through another resistor R1.

In the operating setting of the apparatus, when switch SW connects cathode $k$ to ground, resistors R1 and R2 have substantially no effect. In this setting, a signal substantially proportional to the logarithm of the instantaneous neutron flux impressed between the control electrode $e$ and the cathode $k$ of Amplifier A1, produces in the meter MF and indication of the instantaneous magnitude of the flux. When the nuclear reactor is going critical, this indication changes at a predetermined rate to indicate the increasing Neutron Flux. During this operation, the output of Amplifier A1 is impressed on the Differentiating Network which measures the rate-of-change of the flux. The measurement is precise because the whole potential drop produced at the output of A1 is impressed across the capacitor C$i$ of the Differentiating Network by reason of the feedback operation of the Period Amplifier A2. The meter MP measures this rate-of-change and its indication should be constant where the logarithm of the flux changes linearly. If the meter is properly calibrated, it presents precise information as to whether or not the flux is changing at a proper rate.

When the measuring apparatus is to be calibrated, the switch SW is operated, disconnecting the cathode $k$ from ground and grounding the electrode $e$. The grounding of electrode $e$ suppresses the negative feedback of A1 and permits the maximum amplification of A1 to be applied during the calibration. The disconnection of the cathode $k$ from ground causes the negative feedback circuit including the resistor R2 to function in a manner similar to a regulator to return the cathode $k$ substantially to ground potential. The effect of the operation of the switch SW is then to produce a variation between the control electrode and the cathode of the Amplifier A1 which causes the Differentiating Network to be charged at a predetermined linear rate. The signal producing this effect may be measured by the meter MF. The rate-of-change of this signal can be measured by the meter MP. The rate-of-change of the reading of meter MF may be adjusted to correspond to the reading of MP by resistor R$f$.

The resistor R2 is then set to produce an indication corresponding to a desired rate-of-change indication of MF and the duration of a predetermined change in the indication of MF is timed. In this way information is obtained as to the setting of MP which corresponds to the duration of a change of MF that would be produced by a change in flux, say of several decades, for example 2 or 3. The meter MP is thus calibrated so that the meaning of its indication in terms of rate-of-change of neutron flux is known.

The apparatus disclosed in FIG. 1 and the method of calibrating this apparatus in accordance with the invention may be understood from the following analysis of the operation of the apparatus. In this analysis, the magnitudes of the various components are identified by their labels in FIG. 1 and the voltages at different points labelled E$i$, V$es$, E$p$ and EL are identified by these labels. The amplifications of amplifiers A1 and A2 are identified by letters A1 and A2.

When the switch SW is opened the cathode voltage, V$k$, tends to rise toward the potential E$i$, but is held virtually at ground potential because of the large negative feedback from the output of the Period Amplifier A2. The voltage drop across resistor R2, therefore, appears at the output of the Period Amplifier as the voltage E$p$. The voltage E$p$ multiplied by the divider factor K of the Amplifier A2, causes a constant current to flow through the feedback impedance including R$f$ and C$f$. Since the Period Amplifier has a high input impedance, and the Amplifier A2 input voltage is held near ground potential by the action of negative feedback, the same current must flow through R$i$ and C$i$, thus producing voltage, EL, which rises linearly with time at a rate determined by the values of C$i$, R$f$, K and E$p$. The full range of the Level Amplifier can thereby be used for calibration. The rate of rise of EL can be conveniently timed and the magnitudes of C$i$, R$f$, and K adjusted to give the proper rate, with respect to a voltage E$p$. In practice, the voltage E$p$ is first established by adjusting resistor R2 and then either R$f$ or the value of K is also adjusted. Since components C$i$ and R$f$ and the magnitude of K also determine the output voltage of the Period Amplifier when it differentiates a signal from the Level Amplifier, proper adjustment of these parameters for the correct rate of rise EL, also determines the correct calibration of the Period Amplifier for normal operation.

The basic operation of the calibration is unaffected by magnitudes of resistance, R$i$, and capacitor C$f$. These components are added to the Differentiating Network to deaden its response to fast transients introduced extraneously. The analysis then assumes zero magnitude for these components, to simplify the equations which define the basic operation of the apparatus. Also both Amplifiers are assumed to have infinite bandwidth.

Referring to the circuit of FIG. 1, the equations of state beginning at time $t=0$ with ($s$) as an operator are:

$$\frac{Ei(s)-Vk(s)}{R1}=\frac{Vk(s)-Ep(s)}{R2} \quad (1)$$

$$Vk(s)=\frac{EL(s)}{A1} \quad (2)$$

$$EL(s)=\frac{Ei(s)+(R1/R2)EP(s)}{\frac{1}{A1}\left(1+\frac{R1}{R2}\right)} \quad (3)$$

The output voltage E$p$($s$), as a function of input voltage EL($s$) can be shown to be:

$$Ep(s)=-EL(s)A2\left(\frac{s}{s+\alpha}\right) \quad (4)$$

where $$\alpha=(KA2+1)\left(\frac{1}{CiRf}\right) \quad (5)$$

where K is the fraction of the voltage E$p$ fed back to the input of A2.

Substituting for EL($s$) from Equation 3 and letting E$i$ be a step function applied at time $t=0$, into Equation 4, the following equation results:

$$Ep(s)=Ei\left(\frac{R2}{R1}\right)\left[\frac{1}{\left(1+\frac{R1+R2}{R1A1A2}\right)s+\left(\frac{R1+R2}{R1}\right)\frac{\alpha}{A1A2}}\right] \quad (6)$$

In the practice of this invention, the magnitude of the fraction $$\frac{R1+R2}{R1}$$

approaches 1, and the magnitude of $$\frac{1}{A1A2}$$

is negligible compared to 1. The equation of $Ep(s)$ when these approximations are made becomes:

$$Ep(s) = Ei\left(\frac{R2}{R1}\right)\left(\frac{1}{s+\frac{\alpha}{A1A2}}\right) \qquad (7)$$

The inverse transform of Equation 7 yields the expression for $Ep(t)$ as a function of time:

$$Ep(t) = Ei\left(\frac{R2}{R1}\right)\epsilon^{-\left(\frac{K}{A1}\right)\left(\frac{1}{RfCi}\right)t} \qquad (8)$$

For magnitudes of time such that $$\frac{K}{A1CiRf}t = 0.1 \qquad (9)$$

The voltage $Ep$ defined by Equation 8 rises to predetermined magnitude and remains substantially at this magnitude, that is $Ep$ approximates a step.

In the apparatus in accordance with this invention actually constructed:

$K = \frac{1}{8}$
$Ep = 10$ volts (full range output)
$Rf = \frac{1}{2}\ 10^6$ ohms
$Ci = 10^{-5}$ farad
$A1 = 150$ volts/volt Substituting these magnitudes into Equation 9 a magnitude of $t$ equal to 600 seconds is obtained which is seen to be adequate for calibration purposes. The desired magnitude of period voltage, $Ep$ can be readily and independently established by proper adjustment of resistor R2.

The period voltage as a function of time then is given by Equation 10.

$$Ep(t) = 10\ \epsilon^{-0.00017t}\ \text{volts} \qquad (10)$$

The output voltage of the Log-Level Amplifier, $EL(s)$ is from Equations 4 and 7:

$$EL(s) = \left(\frac{Ep}{A2}\right)\left[\frac{s+\alpha}{s\left(s+\frac{\alpha}{A1A2}\right)}\right] \qquad (11)$$

As a function of time the output voltage is given by Equation 12.

$$EL(t) = \frac{Ep}{A2}\epsilon^{-\frac{\alpha}{A1A2}t} + EpA1\left(1-\epsilon^{-\frac{\alpha}{A1A2}t}\right) \qquad (12)$$

For small magnitudes of time which is the condition during calibration, the second term on the right of Equation 12 is to a good approximation equal to $$Ep\frac{\alpha}{A2}$$

The exponential of the first term approaches 1 for small magnitudes of time. Equation 12 then becomes:

$$EL(t) = \frac{Ep}{A2} + EpK\left(\frac{1}{RfCi}\right)t \qquad (13)$$

Substituting the circuit magnitudes used in the practice of this invention the output voltage is shown by Equation 14:

$$EL(t) = \frac{1}{15} + \frac{1}{4}t\ \text{volts} \qquad (14)$$

Thus the output voltage wave form is seen to be a small step, which in practice corresponds to approximately 10% of a decade of level, plus a linear rise.

The required magnitude of $EL(t)$, as determined by calibration of the Log-Level Amplifier, is given by Equation 15:

$$EL(t) = \frac{.434ELm}{DP}t \qquad (15)$$

Where:
$Elm$ = full range output voltage of the Log-Level Amplifier
$D$ = number of decades represented by $ELm$
$P$ = reactor period (in seconds) that is, the time required for the neutron flux level to change by an E factor $\epsilon$ the Naperian base.

From Equations 13 and 15:

$$0.434\frac{ELm}{DP} = EpK\left(\frac{1}{RfCi}\right) \qquad (16)$$

from which $$P = 0.434\left(\frac{ELm}{Ep}\right)\left(\frac{1}{RfCi}\right)\left(\frac{1}{KD}\right) \qquad (17)$$

In the practice of this invention, the magnitude of $ELm$ is established by calibration of the Level Amplifier and indicating circuit. The magnitude $Ep$ corresponding to a given period P, is obtained by adjustment of resistor R2. Adjustment of resistor Rf, can then be made to determine the proper rate of rise of level output voltage $EL(t)$, which can be conveniently timed with a stop watch.

Figure 2:
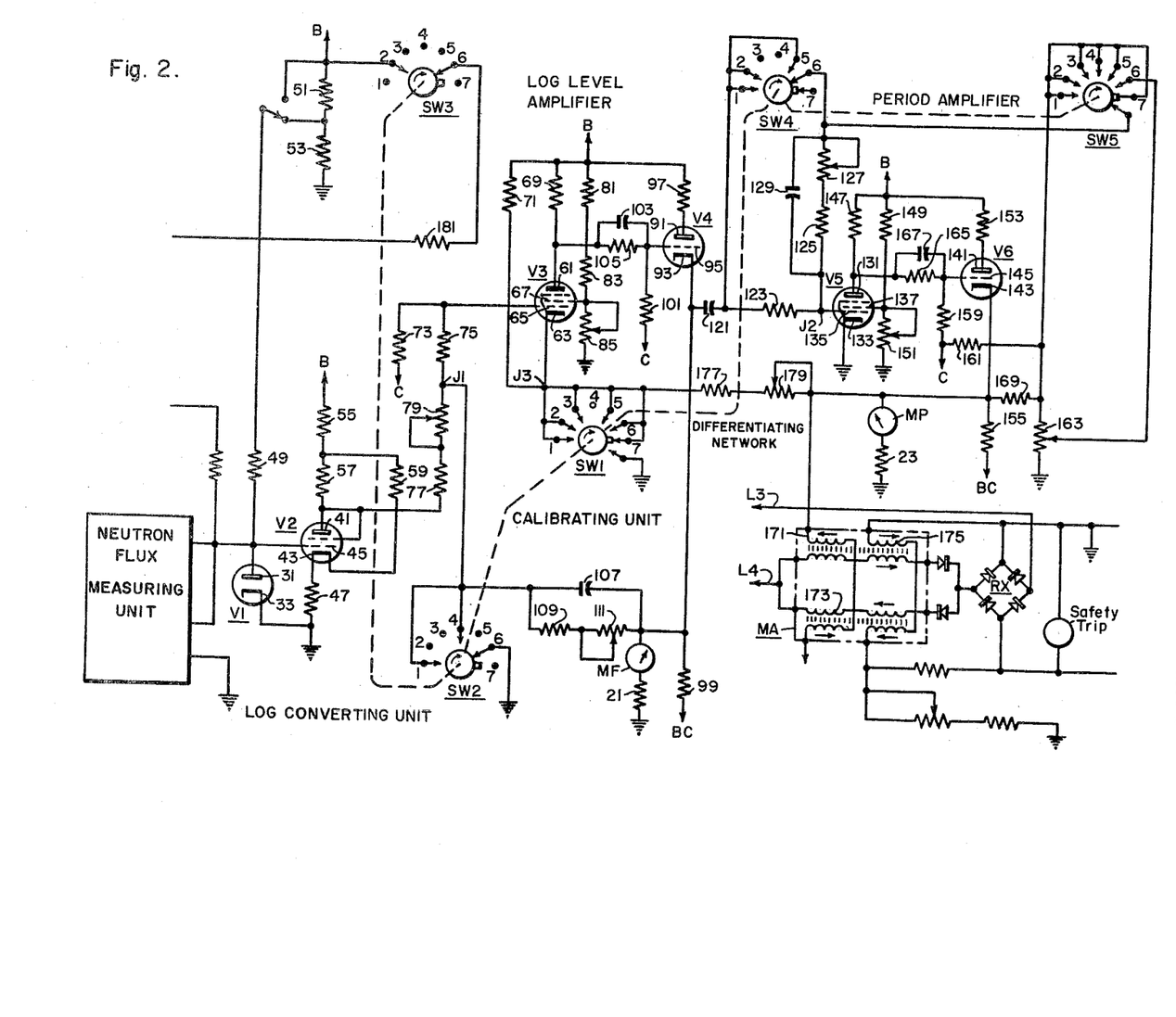
FIG. 2 is a circuit diagram of an embodiment of this invention in which the valves of the amplifiers are of the electronic type.

FIG. 2 is a circuit diagram of apparatus in accordance with this invention. This apparatus includes a Neutron Flux Measuring Unit, a Log Converting Unit, a Log-Level Amplifier, a Differentiating network, a Period Amplifier, and a Calibrating Unit. This apparatus is supplied from a multivoltage direct current supply having a common ground and poles B, C, BC, B being positive and C and BC negative relative to ground. The voltages at poles B and C are regulated; BC is unregulated. The apparatus is set for different operations by a multi-section switch having sections SW1, SW2, SW3, SW4, and SW5. When the knob of this switch is operated, these sections are moved together.

The Log Converting Unit includes a diode V1 and an electrometer tube V2. The diode has an anode 31 and a cathode 33 and has the property that the potential between its anode 31 and cathode 33 is substantially proportional to the logarithm of the current flowing between its anode and cathode. The output of the Flux Measuring Unit is connected between the anode 31 and the cathode 33 so that the diode V1 conducts the current of the flux measuring unit which is proportional to the neutron flux.

The electrometer tube V2 includes an anode 41, a cathode 43, and a grid 45. The construction of this tube V2 is such that there is a very high impedance between its grid 45 and cathode 43. The anode 31 of the tube V1 is connected to the grid 45 and the cathode 33 to the cathode 43 of the tube V2 through a biasing resistor 47. The tube V1 is supplied through an anode resistor 49 with potential from pole B through a voltage divider consisting of a pair of resistors 51 and 53 across the supply. The anode 41 of the electrometer tube V2 is connected to B through a pair of resistors 55 and 57. The cathode 43 is supplied with heating current from the junction of the resistors 55 and 57 through a voltage drop resistor 59. One terminal of the cathode is connected between the junction of the resistors through the voltage drop resistance 59.

The Log-Level Amplifier includes an input tube V3 and an output tube V4. The tube V3 has an anode 61, a cathode 63, a control grid 65, and a screen grid 67. The anode 61 of tube V3 is connected to B through an anode resistor 69. The cathode 63 is connected to B through a high resistor 71 and is adapted to be connected to ground through the section SW1 of a selector switch in the operating setting (7) of the switch. In the calibrating setting (4) of the switch, the cathode 63 is disconnected from ground. The control grid 65 of the tube V3 is connected to pole C through a grid resistor 73. The control grid 65 is also connected to the anode 41 of the electrometer tube V2 through a pair if fixed resistors 75 and 77 and a variable resistor 79, which is set to set the response of the circuit to the lowest neutron flux. Since the anode 41 of the electrometer tube is connected to B, the potential on the control grid 65 is determined by the algebraic difference between the potentials B and C and by the resistors 55, 57, 77, 79, 75. The screen grid 67 of the tube V3 is supplied with potential from a voltage divider connected between B and ground. This divider includes a pair of fixed resistors 81 and 83 and a variable resistor 85, the screen grid being connected between the variable resistor 85 and one of the fixed resistors 83. The resistor 85 is set to set the zero point of the operation of the Log-Level Amplifier.

The tube V4 includes an anode 91, a cathode 93, and a grid 95. This tube is connected as a cathode follower. The anode 91 is connected to B through an anode resistor 97. The cathode 93 is connected to ground through the meter MF and the resistor 21. The meter MF thus measures the change in the current conducted by the tube V4. To set the tube V4 in the proper operating range, the cathode is connected to BC through a resistor 99 which is high compared to the sum of the resistance of the meter MF and its series resistor 21. The grid 95 of V4 is connected to C through a high grid resistor 101. The grid 95 is also connected to the anode 61 of tube V3 through a coupling network including a capacitor 103 shunted by a high grid resistor 105. There is a negative feedback connection between the cathode 93 of the tube V4 and the control grid 65 of the tube V3. This connection includes a network consisting of a capacitor 107 shunted by a fixed and a variable resistor 109 and 111. The network 107—109—111 is connected to the junction J1 of the fixed and a variable resistor 75 and 79 in the operating setting of section SW2. In the calibrating setting the junction J1 is grounded. The negative feedback connection has the effect of reducing the amplification of and stabilizing the Log-Level Amplifier. The variable resistor 111 in the feedback connection is set to set the response of the Log-Level Amplifier to the signal corresponding to maximum neutron flux.

The Differentiating Network includes a capacitor 121, fixed resistors 123 and 125, and a variable resistor 127. The fixed resistor 125 and the variable resistor 127 are shunted by another capacitor 129 which in cooperation with resistor 123 constitutes a time delay network for suppressing transients.

The Period Amplifier includes a pair of tubes V5 and V6. Tubes V4 and V6 may be sections of a double triode. The tube V5 has an anode 131, a cathode 133, a control grid 135, and a screen 137. The tube V6 has an anode 141, a cathode 143, and a control grid 145. The anode 131 of V5 is connected to B through an anode resistor 147. The cathode 133 is grounded. The control grid 135 is connected to the junction J2 of resistors 123 and 125 of the differentiating Network. The screen grid 137 is connected intermediate a fixed resistor 149 and a variable resistor 151 which are, in turn, connected in series between B and ground. The variable resistor 127 sets the gain of the Period Amplifier and the resistor 151 sets this Amplifier for infinite period. This is the indication of the period meter MP when zero or a constant potential is impressed on the Differentiating Network.

The tube V6 is connected as a cathode follower similarly to the tube V4. The anode 141 of V6 is connected to B through an anode resistor 153. The cathode 143 is connected to BC through a resistor 155. The meter MP is connected between the cathode and ground through the resistor 23. The resistor 155 in series with BC has a resistance which is high compared to the combined resistances of the meter MP and its series resistor 23.

The grid 145 of V6 is connected to C through a high grid resistor 159 and to ground through resistor 159, a fixed resistor 161 and a variable resistor 163. The grid 145 of V6 is controlled from the anode 131 of V5 and is connected to this anode through a coupling network including a resistor 165 shunted by a capacitor 167.

To maintain the drop of any signal potential impressed across the capacitor 121 constant, a feedback network is provided between the cathode 143 of the cathode follower and the control grid 135 of V5. This feedback network includes a high resistor 169 connected to the cathode 143 which is connected to the grid 135 through the variable and fixed resistors 127 and 125 of the Differentiating Network shunted by the capacitor of the transient suppressing network. The negative feedback connection to the grid of V5 is completed both in the operate and in the calibrate position of the apparatus, through switch SW5.

The cathode 143 of the follower V6 is also connected to switching apparatus which operates to deenergize the nuclear reactor when the rate of rise of flux is excessive. For this purpose, a magnetic amplifier MA is provided. This amplifier MA has control windings 171, output windings 173, and feedback windings 175. The control windings 171 are connected to the cathode 143 of V6 preferably through metering equipment (not shown) which indicates the period of the amplifier. The output windings 173 control the supply of power from supply conductors L3 and L4 to the tripping mechanism (not shown) for deenergizing the nuclear reactor. The windings 173 are connected to the mechanisms through self-saturating rectifier network Rx. The feedback windings 175 are connected across the output of the rectifier network.

The Calibrating Unit includes in addition to the resistor 71 between the cathode 63 of the input tube V3, a fixed resistor 177 and a variable resistor 179 connected between the cathode 143 of the follower V6 and the cathode of the input tube V3 to the Log-Level Amplifier. In the operate position (7) of the switch, section SW1, the cathode 63 of the tube V3 is grounded so that the resistors 177 and 179 of the Calibrating Unit are shunted out. In the calibrate position the switch SW1 disconnects the cathode of V3 from ground and the resistors 177 and 179 become effective to produce negative feedback.

The apparatus may be calibrated by properly setting the selector switch SW1 through SW5. With this switch in the zero position (1) the junction J1 of the low setting variable resistor 79 and the resistor 75 in series with it is connected to ground through SW2. Since the setting of the zero resistor 85 controls the potential of the screen grid of V3 it also controls the grid and cathode potential of V4. With the selector switch in the zero position (1) the zero setting variable resistor 85 can be adjusted to produce zero current through meter MF. Since the meter MF is returned to ground, the cathode of V4 is at ground potential when zero current flows through the meter MF.

With the selector switch in the level test position (2) and with no input signal, low-setting variable resistor 79 can be adjusted to produce zero current through the meter MF. The junction J1 must be then at ground potential. Since the cathode of V4 is at ground potential, no current then flows through the high-setting variable resistor 111. Thus the high setting resistor affects the gain of the Amplifiers only at levels above zero input. This resistor 111 is used to calibrate the high end of the scale of meter MF. With the selector switch in the level test position (2) the potential B is applied to the resistor 181 through switch SW3. In this position of the selector switch, a current, for example, of .1 milliampere, that is $10^{-4}$ amperes may be provided for calibration of the high end of the scale of MF and a current of $10^{-7}$ amperes for example, may be provided to check the intermediate scale reading of the meter MF.

When the selector switch is in either the infinite period position (2) or the operating position (7) and with no input level signal, the setting of the infinite period resistor 151 can be varied to produce an indication of infinite period on meter MP. The setting of the infinite period variable resistor 151 determines the potential of the screen grid 137 of V5 and thus determines the grid and cathode potential of V6.

When the selector switch is in the calibrate position (4) the resistor 75 in series with the low-setting variable resistor 79 is connected to ground through SW2 and the cathode of V3 is disconnected from ground at SW1. In this position of the sectional switch the Log-Level Amplifier becomes a cathode driven amplifier. Resistors 71, 177, 155 and the variable resistor 179 make up a voltage dividing network between the pole B and the negative pole BC. When the cathode 63 of V3 is disconnected from ground, its potential tends to rise sharply to the potential of the junction J3 of resistors 71 and 177. As a result of the sharp rise in cathode potential the plate potential of V3 rises sharply causing the rise of the cathode potential of V4. Because of the high rate of change of the voltage applied to the differentiating capacitor, a positive pulse is produced at the control grid of V5. The resulting negative pulse appearing at the cathode of V6 (the differential of a square wave is a pulse) is coupled to the period meter MP. After the occurrence of the pulse, the cathode potential of V6 attempts to rise in a positive direction and as it rises, the cathode potential of V3 tends to rise. The plate potential of V3 and the cathode potential of V4 then rises preventing the cathode potential of V6 from rising. From that point on as the cathode of V6 attempts to rise this voltage is amplified by V3 and appears at the cathode of V4 as a voltage which varies as a linear function of time. Thus a relatively constant period voltage is produced at the cathode of V4 until V3 saturates.

The setting of the variable resistor 179 determines the magnitude of the resistance in the Differentiating Network. Thus, when the selector switch is placed in the calibrate position (4) the setting of the variable resistor 179 determines the rate at which the differentiating capacitor can charge. The setting of this variable resistor 179 then varies the period output voltage for a given rate of change of the voltage across the differentiating capacitor. The Period Amplifier can be adjusted by adjusting the variable resistor 179 for a period indication, for example of 3 seconds on the period meter MP. The voltage change across the differentiating capacitor 121 is then adjusted to set the period by adjusting the variable resistor 127 to give a rate-of-change on the meter MF of for example, 7 seconds per decade.

In the reset position (5) of the selector switch the resistors 123, 125, 127 of the Differentiating Network are shorted out so that the differentiating capacitor 121 can discharge rapidly. In addition, the cathode 63 of V3 is grounded. The reset connections of the selector switch accelerate the calibration.

Figure 3:
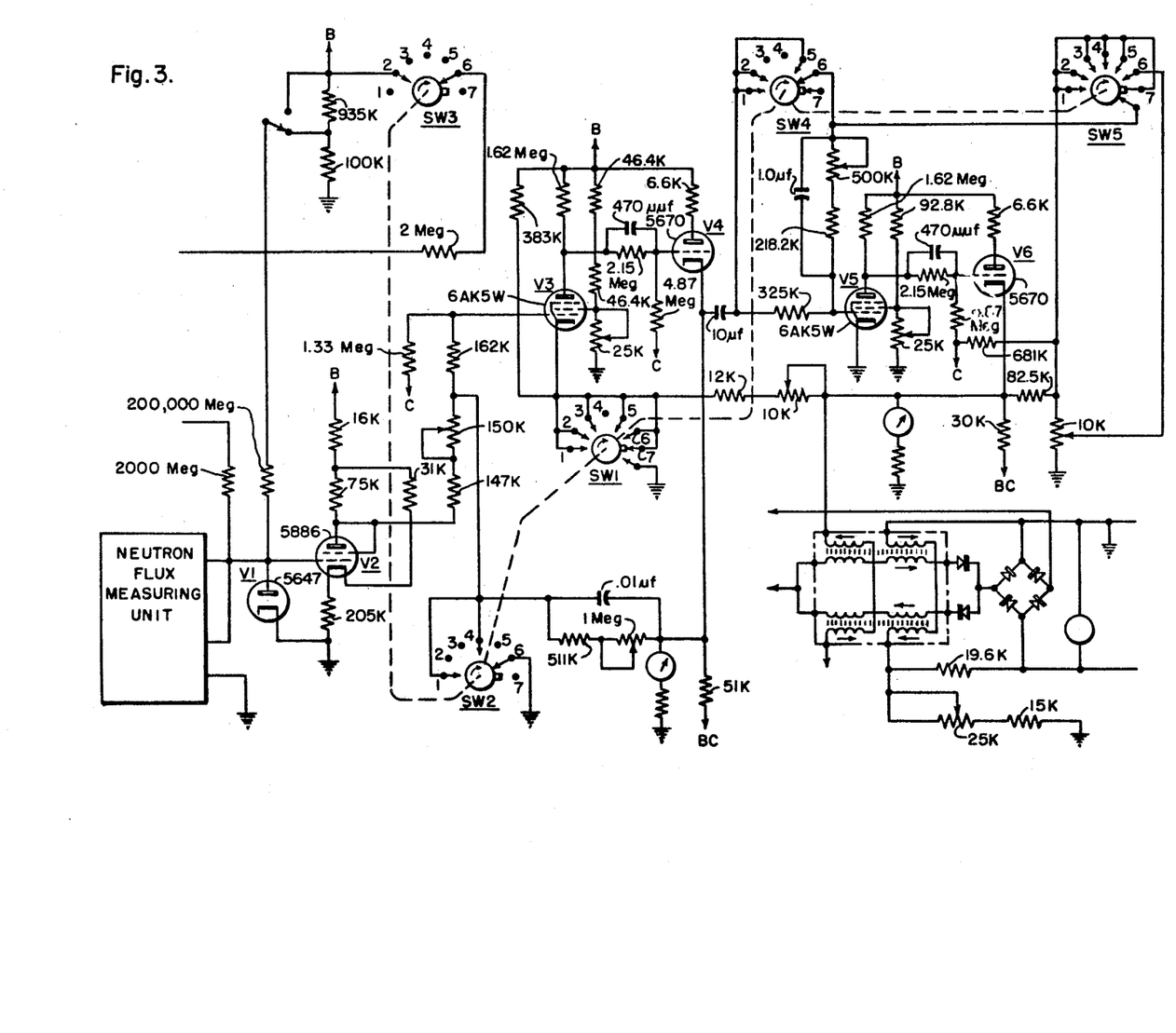
FIG. 3 is a circuit diagram similar to FIG. 2 showing the magnitudes of the components used in apparatus similar to FIG. 2 which were constructed and found to operate highly satisfactorily.

In the operation of the apparatus shown in FIGS. 2 and 3, the output of the Neutron Flux Measuring Unit is impressed across discharge device V1 and the meters MF and MP are observed. When the reactor is going critical the flux increases. The actual increase is observed on the meter MF, the rate of increase on the meter MP. If the rate of increase is excessive, the magnetic amplifier MA connected to the cathode 143 of V6 is energized actuating the tripping mechanism (not shown) which deenergizes the nuclear reactor.

While the apparatus shown in FIGS. 2 and 3 has in actual practice proved highly reliable and readily maintained and its adjustment has been effected readily by the operating personnel, improvement in these respects is desirable and thus achieved with the apparatus shown in FIGS. 4A, 4B, 5A, 5B, 5C, 5D. The apparatus shown in these views includes only one discharge tube V7. This device V7 is a so-called logarithmic pentode which has the property of converting the output of the Flux Measuring Apparatus into a potential proportional to the logarithm of the flux.

Like the apparatus shown in FIG. 1, the apparatus shown in FIGS. 4A, 4B, 5A, 5B, 5C, 5D include a Log-Level Amplifier, a Period Amplifier, a Differentiating Network, and a Calibrating Unit. This apparatus may be energized from the conductors L1 and L2 of 115-volt alternating current supply. Voltages different than that from the supply are supplied by conductors AL1 and AL2, AL3 and AL4, AL5 and AL6, AL7 and AL8, AL9 and AL10, AL11 and AL12, energized through transformers T1, T2, T3, T4, T5 and T6, respectively, from the conductors L1 and L2. Direct current potential is derivable from rectifiers RX1 and RX2 which are, in turn, energized from the conductors L1 and L2. The apparatus includes a plurality of switches SW6, SW7, and SW8 for setting the apparatus for operation or for calibration.

Figure 4A:
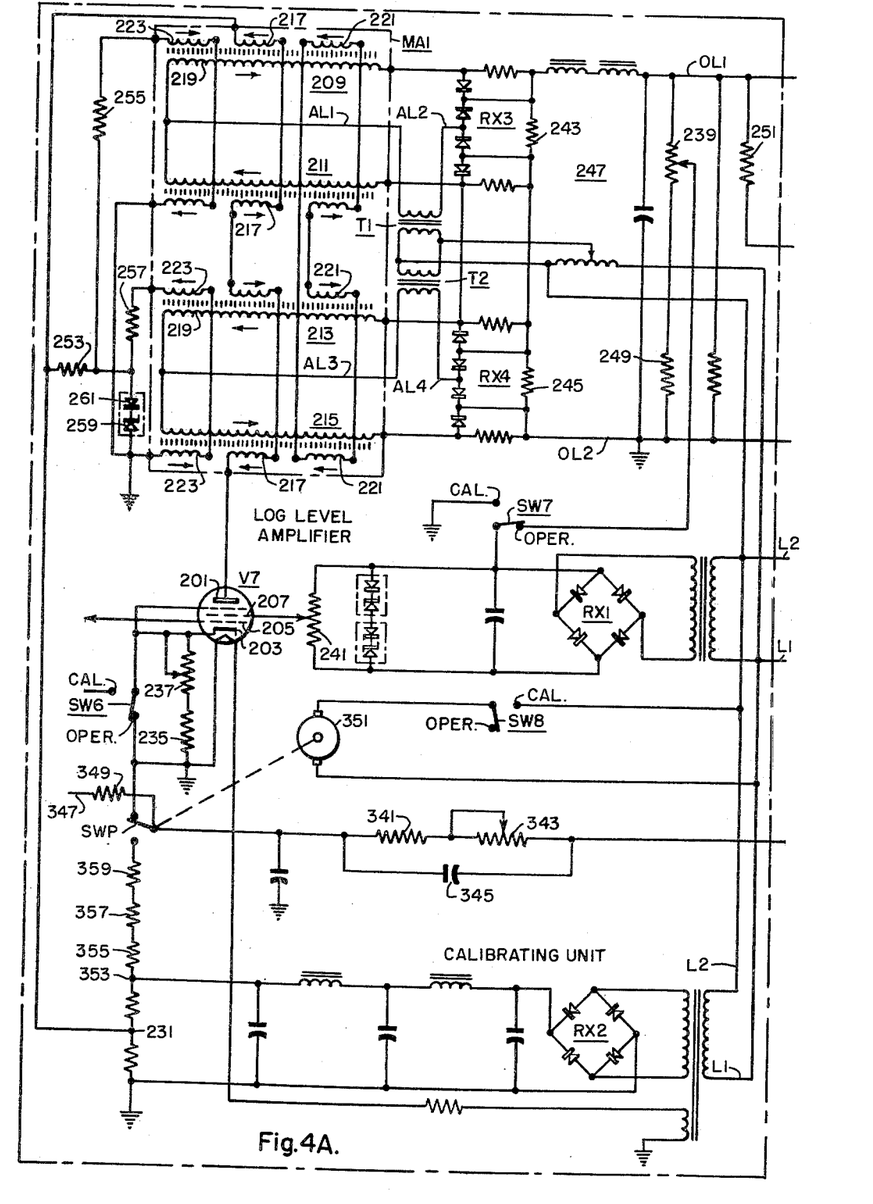
FIGS. 4A and 4B together constitute a circuit diagram showing a modification of this invention in which the valves of the amplifiers except the input valve are magnetic amplifiers.
Figure 4B:
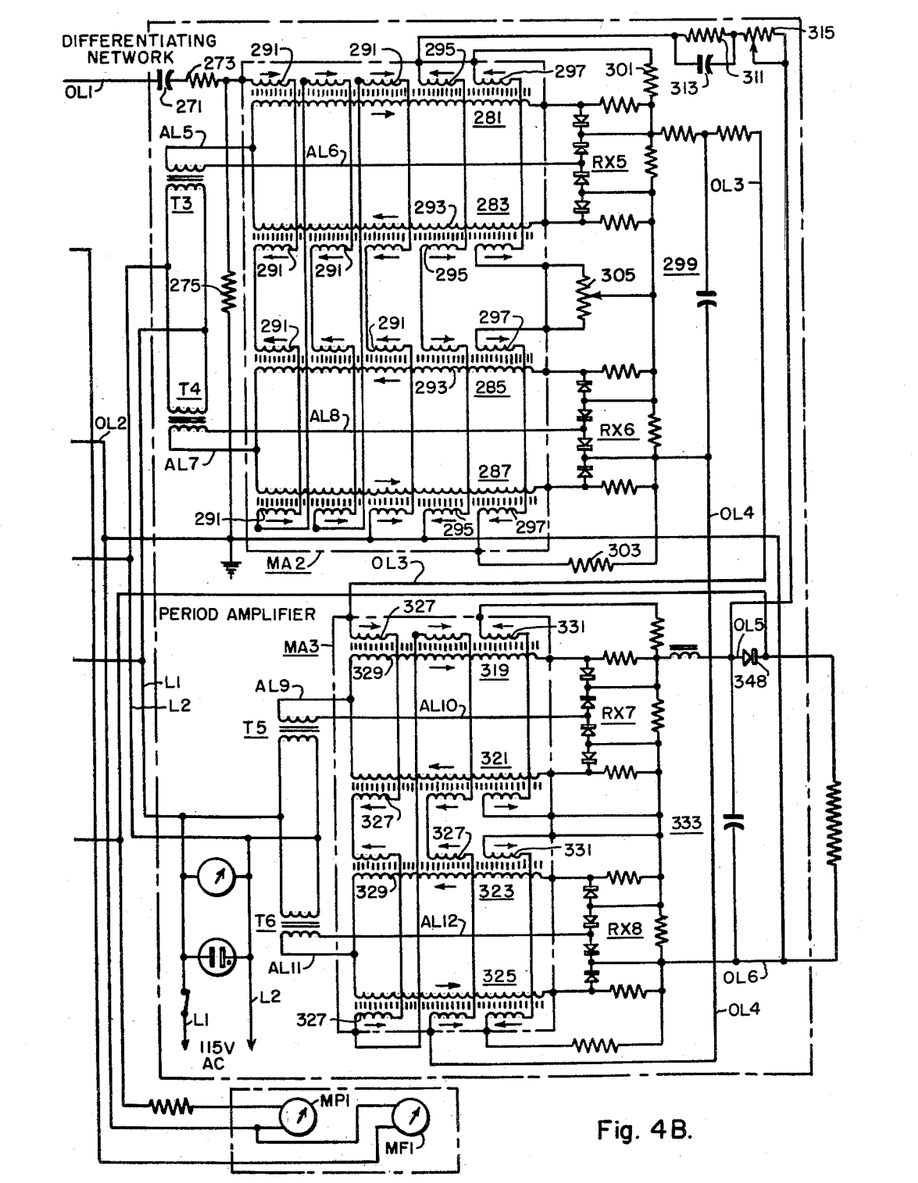
Figure 5A:
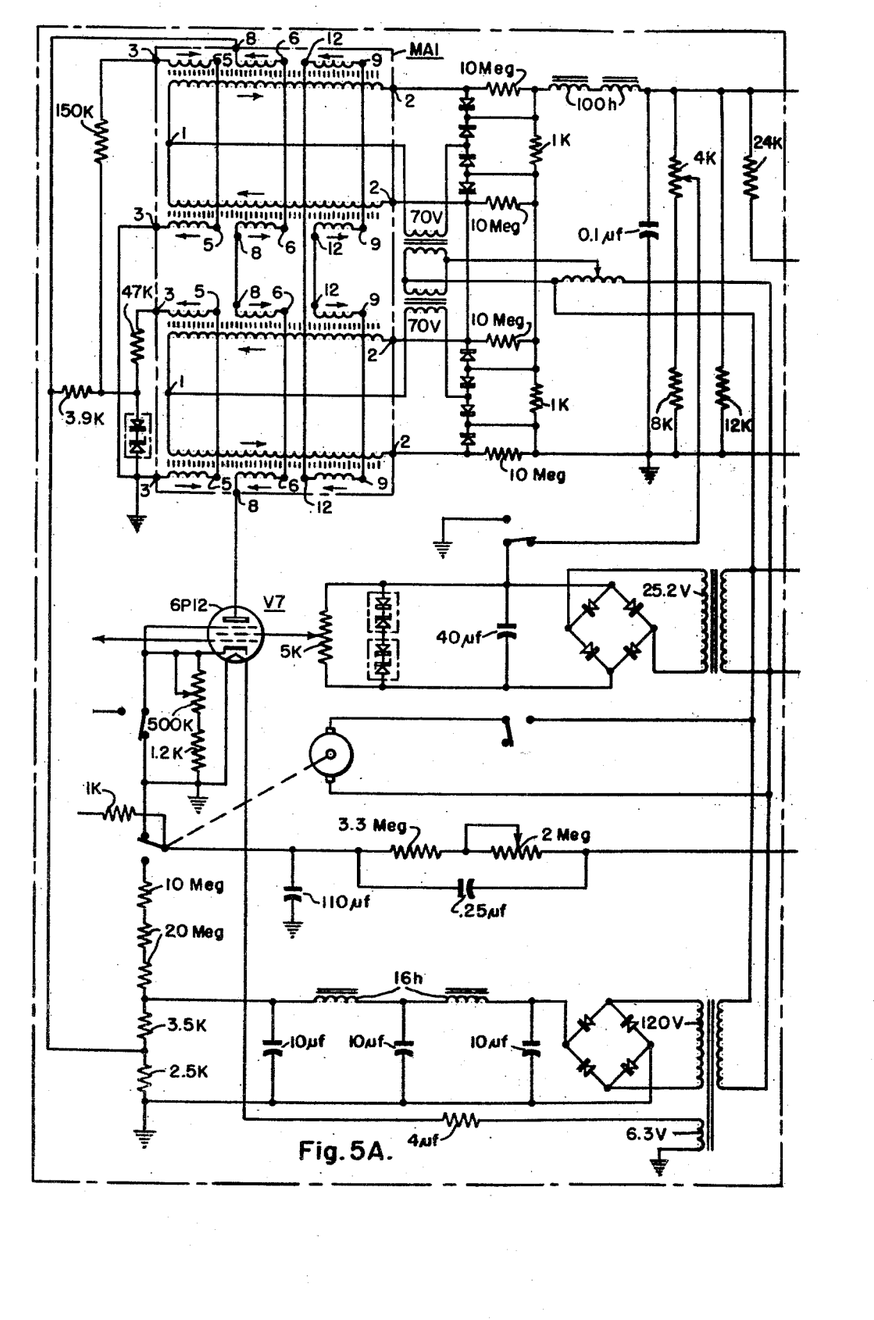
FIGS. 5A and 5B together constitute a circuit diagram similar to FIGS. 4A and 4B but showing the magnitudes of the components of apparatus as shown in FIGS. 4A and 4B which were constructed and found to operate satisfactorily.
Figure 5B:
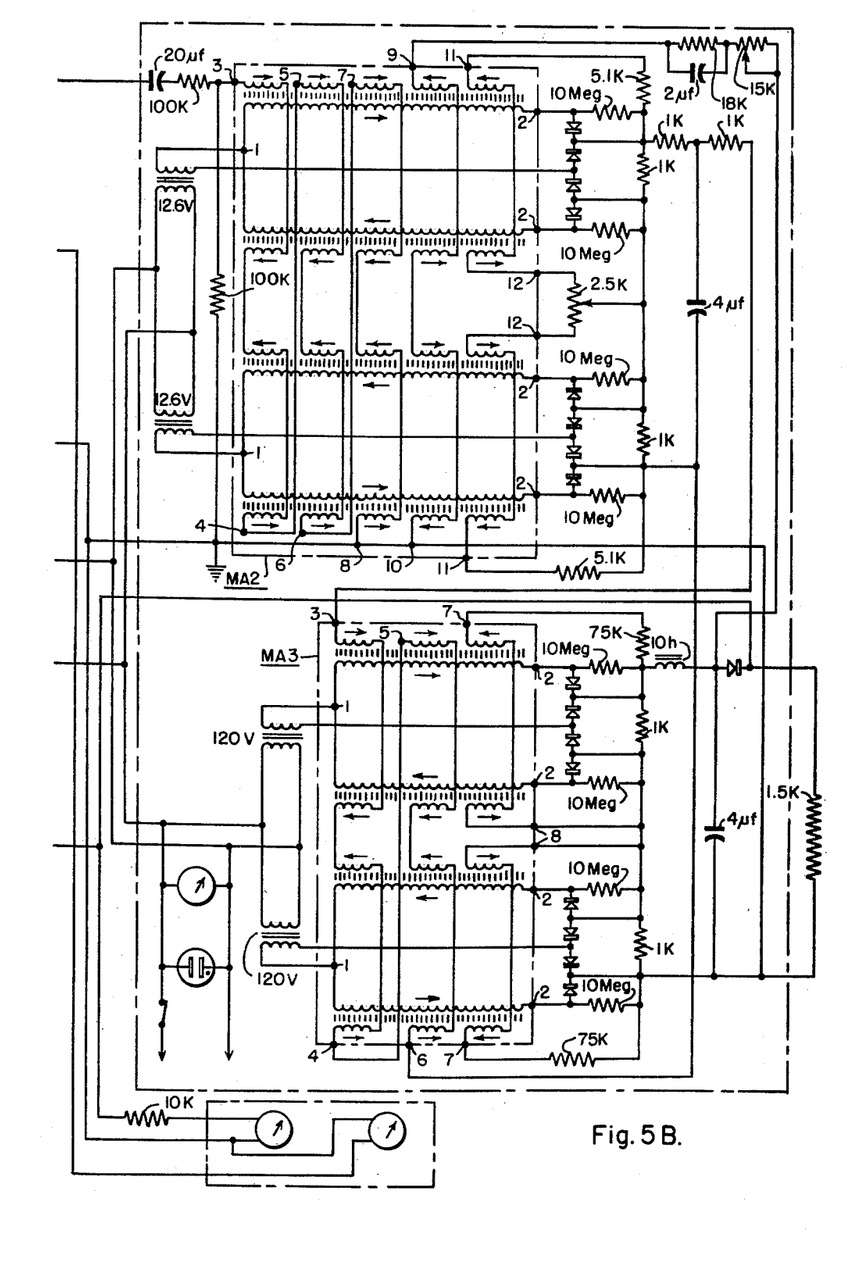
Figure 5C:
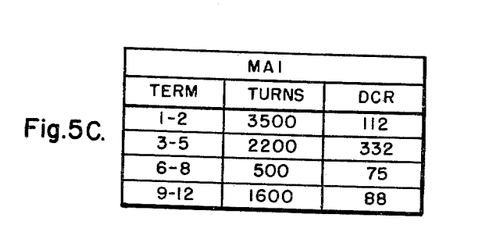
FIGS. 5C and 5D are tables showing the terminal-turns relationship of the reactors included in the apparatus shown in FIGS. 5A and 5B.
Figure 5D:
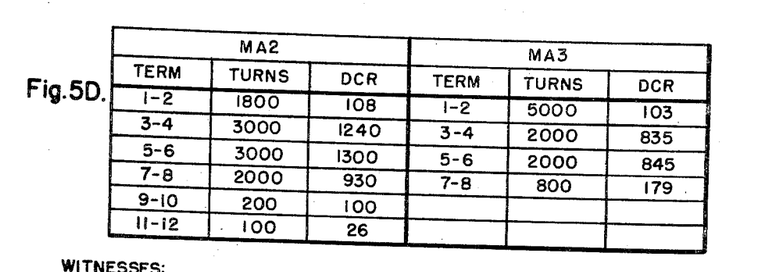

The Log-Level Amplifier includes the tube V7 and a magnetic amplifier unit MA1. The tube V7 has an anode 201, a cathode 203, a control grid 205, and a screen grid 207. The magnetic amplifier MA1 includes a plurality of sections 209 and 211 and 213 and 215 each having a control winding 217, an output winding 219, a short circuiting winding 221, and a bias winding 223. Two associated sections 209 and 211 of the magnetic amplifier MA1 are supplied with potential from conductors AL1 and AL2. The other sections 213 and 215 are supplied with potential from conductors AL3 and AL4.

The anode 201 of V7 is connected to a positive tap 231 of the rectifier RX2 through the control windings 217 of the four sections of MA1 connected in series. The cathode 203 of V7 is grounded through switch SW6 in the operate setting of the apparatus and through a variable resistor 237 and a fixed resistor 235 which provide a bias in the calibrate setting of the apparatus. The control grid 205 is connected to the output of the Neutron Flux Measuring Unit. The screen grid 207 is connected to the high-adjustment variable resistor 239 through the low-adjustment variable resistor 241 which is supplied from RX1 in the operating position of the switch SW7 and to ground through the low-adjustment variable resistor 241 in the calibrating position of the same switch. The output windings 219 of the two associated sections 209, 211 of the magnetic amplifier MA1 are supplied from conductors AL1 and AL2 and are connected across a resistor 243 through a bridge rectifier RX3. The output winding 219 of the other sections 213, 215 are similarly connected through a bridge rectifier RX4 across a resistor 245. The sections 209 and 211 and 213 and 215 are balanced. The output of the magnetic amplifier MA1 is derived from conductors OL1 and OL2 which are connected through a filter 247 to the positive terminals of the rectifiers RX3 and RX4. The pairs of sections 209, 211 and 213, 215 of the reactor MA1 are connected in balanced relationship so that the output current of one of the rectifiers RX3 is increasing while that of the other (RX4) is decreasing. The output potential to the filter 247 is thus determined by twice the gain of each of the pairs 209, 211 and 213, 215 of sections and variations such as those resulting from the variations in the supply are suppressed by the balanced operation of the sections of the reactor MA1.

The short circuiting windings 221 of the four sections of amplifier MA1 are connected in series in the short circuiting loop. The short-circuited windings determining the time response of the Amplifier so that oscillation does not occur in spite of the high feedback impressed through the resistor 239. The bias windings 223 of MA1 are supplied by the voltage across a pair of oppositely connected silicon diodes 259 and 261. These diodes are supplied from pole 231 of rectifier RX2 through resistor 253. The diode 259 is connected to function as a Zener diode and the two diodes cooperate to produce temperature compensation. The windings 223 of sections 209, 211 are supplied through resistor 255 and the others (213, 215) through resistor 257.

The high-adjustment resistor 239 is connected in series with a fixed resistor 249 across the conductors OL1 and OL2. The connection from the high adjustment resistor to the screen grid 207 of V7 is a high negative-feedback connection which operates as a stabilizing feedback holding the anode current of V7 substantially constant. A meter MF1 is connected between conductors OL1 and OL2 through a resistor 251. This meter measures the logarithm of the neutron flux.

The Differentiating Network includes a capacitor 271 in series with a resistor 273. This network is connected between conductors OL1 and OL2 through a resistor 275.

The Period Amplifier includes a pair of magnetic amplifiers MA2 and MA3. Magnetic amplifier MA2, two pairs of sections 281 and 283 and 285 and 287 associated like the sections of MA1. Each section has a control winding 291, an output winding 293, a feedback winding 295, and a bias winding 297.

The control windings 291 of the four sections 281, 283, 285, 287 are connected in series between the resistor 273 of the Differentiating Network and the conductor OL2. The output windings 291 of one associated pair of sections 281 and 283 of reactor MA2 are supplied from conductors AL5 and AL6 and energizes bridge rectifier RX5. The other pair of output windings 285 and 287 are similarly supplied from conductors AL7 and AL8 and energize rectifier RX6. The pairs of sections of MA2 are balanced in the same way as the pairs of sections of MA1. The positive terminals of these bridges RX5 and RX6 are connected through a filter 299 to conductors OL3 and OL4. The connection of the rectifiers RX5 and RX6 is similar to that of RX3 and RX4.

The biasing windings 297 are connected in series to the positive poles of the rectifiers RX5 and RX6 through resistors 301 and 303 and through a zero adjustment variable resistor 305. Thus, self bias is effected from the output of the magnetic amplifier MA2. The feedback windings 295 are connected in a negative feedback circuit with the output conductors OL5 and OL6 of the amplifier MA3 through a network including a resistor 311 shunted by a capacitor 313 and the period calibrating variable resistor 315.

The amplifier MA3 includes four sections 319 and 321 and 323 and 325 respectively associated in pairs. Each section has a control winding 327, and output winding 329, and a biasing winding 331. The control windings 327 are connected in series across conductors OL3 and OL4. The output windings 329 of two associated sections 319, 321 are supplied from conductors AL9 and AL10 and energized rectifier bridge RX7. The other windings 329 are supplied from conductors AL11 and AL12 and energize rectifier bridge RX8. The positive poles of the rectifier bridges are connected to supply conductors OL5 and OL6 through a filter 333. Conductors OL5 and OL6 are connected to period meter MP1 and also to the switching apparatus (not shown).

The Calibrating Unit includes a network including a fixed resistor 341 and a variable resistor 343 which are shunted by a capacitor 345. The resistor 343 is set to adjust the Period Amplifier Level. This network is connected between conductor OL5 and a calibrating terminal 347 of the apparatus through a rectifier 348 on one side of the network and a resistor 349 on the other side. The calibrating unit also includes a switch mechanism SWP which is actuated by a timer 351 when the switch SW8 is in the calibrate position. When the timer is in operation, the switch SWP alternately connects the calibrate terminal 347 to ground and to the upper pole 353 of rectifier RX2 through a plurality of resistors 355, 357, 359. In the calibrate position, the calibrate terminal 247 is connected usually by means of a jumper to the control grid 205 of V7. Thus, the switch SWP alternately connects the control grid of V7 to the upper pole 353 of RX2 and to ground. The alternate connection time of the switch SWP may be of the order of 30 seconds.

The component magnitude of apparatus which has been found to operate satisfactorily, shown in FIGS. 4A, 4B, are presented in FIGS. 5A, 5B, 5C, 5D but it appears desirable to supplement the FIGS. 5A through 5D disclosure so that the structure of an actually operating system may be clarified.

The magnetic amplifier MA1 consists of four HiMu 80 cores which are connected as shown for push-pull operation. The amplifier MA1 has an open-loop ampere-turn gain of 800 volts per ampere turn and a linear output range of 30 volts for a change over a range of 75 microamperes control current. The filter time constant of the reactors MA1 and the amplifier time constants of this reactor are substantially different so that the transient response is satisfactory.

The rectifiers of the bridges RX3 and RX4 are of the silicon type.

The input-stage amplifier MA2 of the Period Amplifier is a high gain amplifier similar to the amplifier MA1. The output stage preferably has cores of Hypernik V alloy. The overall open loop sensitivity of the Period Amplifier is 10 volts output for 1.3 microamperes input. The Period Amplifier is capable of a linear output range of 30 volts.

The apparatus actually constructed and tested is capable of indicating a rate-of-change in neutron flux of 10 decades per minute, the upper magnitude corresponding to the 10 volts output of the amplifier. This maximum rate corresponds to an input of .67 volt per second into the grid circuit of tube V7.

To calibrate and set the apparatus shown in FIGS. 4A, 4B, 5A, 5B, 5C, 5D for operation, the following procedure is carried out:

With the switches SW6, SW7, and SW8 set for operation, a current of $10^{-4}$ amperes is impressed on the control grid 205 of V7. The variable resistor 241 for low-adjustment is set so that the meter MF1 reads zero decades. Next, the test current is changed to $10^{-10}$ amperes and the variable resistor 239 for high adjustment is set so that the meter MF1 indicates 6 decades.

The Period Amplifier is set to zero by adjusting the zero-adjustment resistor 305 in the self-biasing network connected to MA2. Next, the control grid 205 of the Log-Level Amplifier is connected to the calibrate terminals of the Calibrating Unit and the switches SW6, SW7 and SW8 are moved to the calibrate position. The connection of switch SW8 in the calibrate position energizes the recycling timer 351 causing the switch SWP to move from the position grounding the control grid 205 of tube V7 to the position in which the calibrating control voltage is impressed thereon from rectifier RX2. The recycling timer 351 may be so set that the control grid 205 of V7 is connected to the calibrating bias for 30 seconds and then switch SWP is moved to the grounding or reset position for a short time interval. While the switch SWP is passing through the reset portions of the first 30-second cycle, the low-adjust variable resistor 241 is set so that the meter MF1 indicates six decades (note that at this time the screen grid 207 is connected to ground through the low-adjust resistor 241). During the time during which the switch SWP is connected in the calibrating bias or is in the calibrate portion of its cycle, the period level adjustment resistor 343 is set to give a 10 decade per minute indication on the Period Amplifier. During the succeeding reset portion of the cycle of switch SWP, the meter MF1 should again indicate six decades. During the succeeding calibrate portion of SWP, the vairable resistor 315 for calibrating the Period Amplifier is set to obtain a rate of rise of 10 decades per minute on the meter MF1. The bias adjustment 237 connected between the cathode 203 of V7 and ground in the calibrate setting of SW6 is set to set the point of Log-Level output voltage from which the Period Amplifier calibration is to take place so that the calibration can take place from six decades to three decades or from three decades to zero.

With the apparatus calibrated, the switches SW6, SW7 and SW8 may be reset to operate and the control grid of V7 may be connected to the Neutron Flux Measuring Unit. The meter MF1 then measures the flux in decades and the meter MP1 then measures the period of rise of the flux and the operation of the reactor may be precisely determined.

While a preferred embodiment of this invention has been disclosed herein, it is understood that many modifications thereof are feasible. This invention then is not to be restricted except insofar as is necessitated by the spirit of the prior art.

We claim as our invention:

1. Apparatus for determining the state of a nuclear reactor comprising means for measuring the neutron flux in said reactor, power supply means including a hot connection and a ground connection, a log-level amplifier means connected to said measuring means and to said power supply means for producing an output substantially proportional to the logarithm of the output of said measuring means, said amplifier means including a valve having an anode connected to said hot terminal, a cathode and a control electrode and also including selectively operable switch means for connecting said cathode to said ground connection in the operating setting of said apparatus and for in effect disconnecting said cathode from said ground connection in the calibrating setting of said apparatus, said amplifier means also including means connected to said control electrode for impressing a signal substantially proportional to the logarithm of said output of said measuring device between said control electrode and said ground connection, a period amplifier means connected to said log-level amplifier means for measuring the rate of change of the output of said log-level amplifier means, resistance means connected between said cathode and the output of said period amplifier means, and additional resistance means connected between said hot terminal and said cathode.

2. Apparatus for indicating the state of a nuclear reactor comprising means for measuring the neutron flux in said reactor, means connected to said measuring means for producing a potential substantially proportional to the output of said measuring means, a first amplifier including a first valve having an anode, a cathode, and a control electrode, a second valve having an anode, a cathode and a control electrode, means connected to said control electrode and cathode of said first valve for impressing said potential between said control electrode and cathode, means connecting said anode and cathode of said first valve in circuit with the control electrode and cathode of said second valve so that said second valve is connected as a cathode follower having a first output terminal, a second amplifier having a third valve having an anode, a cathode and a control electrode, and a fourth valve having an anode, a cathode and a control electrode, a differentiating network, means connecting the anode and cathode of said third valve in circuit with the control electrode and cathode of said fourth valve so that said fourth valve is connected as a cathode follower having a second output terminal, first means connecting said network and said second output terminal in series, second means connecting said network to the control electrode of said third valve, said first means including feedback control means for maintaining the potential between the control electrode and the cathode of said third valve substantially at a predetermined magnitude, the potentials of the electrodes of said valves being electrically referred to a ground point, calibrating potential supply means, selectively operable switch means connected to said supply means and to the cathode of said first valve, means for maintaining said calibrating potential disconnected from said control electrode and cathode of said first valve and said cathode of said first valve substantially at said ground point in the operating position of said switch means and for impressing said calibrating potential between said control electrode and cathode of said first valve and for disconnecting said last-named cathode from said ground point in the calibrating position of said switch means, and feedback means connected between the cathodes of said fourth and first valves for maintaining the potential of said last-named cathode at a predetermined magnitude relative to said ground point.

3. The method of calibrating apparatus for measuring the neutron flux of a reactor, said apparatus including a log-level amplifier having an output and also having a valve including a control electrode and a pair of principal electrodes, and a period amplifier having an input and an output, said apparatus being adapted to have a voltage signal substantially proportional to the logarithm of the flux impressed between said control electrode and one of said principal electrodes, said one principal electrode being grounded in the operating condition of said apparatus, and the output of said log-level amplifier being connected to the input of said period amplifier, the said method comprising disconnecting said one principal electrode from ground, connecting said one principal and said output of said period amplifier in a feedback circuit such that said one principal electrode is maintained substantially at ground potential, connecting said control electrode and said one principal electrode in a circuit such that a predetermined calibrating bias is impressed on said control electrode, setting said feedback circuit so that the potential between said output of said period amplifier and ground is at a predetermined magnitude, and measuring the duration of the time interval during which the voltage between said output of said log-level amplifier and ground changes from an initial magnitude corresponding a first neutron flux to a magnitude corresponding to a predetermined change in said first neutron flux.

4. The method of calibrating apparatus for measuring the neutron flux of a reactor, said apparatus including a log-level amplifier having an output and also having a valve including a control electrode means and a pair of principal electrodes, said control electrode means and one of said principal electrodes being connected in a control circuit in which a voltage signal substantially proportional to said flux is impressed between said last-named control electrode means and said one principal electrode, said apparatus also including a period amplifier having an input and an output, said output of said log-level amplifier being connected to said input of said period amplifier, said apparatus also including calibrating potential supply means, the said method comprising disconnecting said control electrode means and said one principal electrode from said control circuit, connecting said control electrode means and said one principal electrode to said supply means to impress said calibrating potential between said control electrode means and said one principal electrode, connecting said control electrode means and said one principal electrode and said output of said period amplifier in a feedback circuit such that a control potential is impressed between said control electrode means and said one principal electrode, setting the output potential of said period amplifier at a predetermined magnitude, and measuring the time interval taken by the output potential of said log-level amplifier to reach a predetermined magnitude with the said output potential of said period amplifier set at said magnitude.

5. The method of calibrating apparatus for measuring the neutron flux of a reactor, said apparatus including a log-level amplifier having an output and also having a valve including a control electrode means and a pair of principal electrodes, said control electrode means and one of said principal electrodes being connected in a control circuit in which a voltage signal substantially proportional to said flux is impressed between said last-named electrodes, said output and said control electrode means being connected in a negative feedback circuit which maintains the potential between said control electrode and said one principal electrode substantially constant, said apparatus also including a period amplifier having an input and an output, said output of said log-level amplifier being connected to said input of said period amplifier, said apparatus also including calibrating potential supply means, the said method comprising disconnecting said control electrode means from said negative feedback circuit and connecting said control electrode means so as to suppress the negative feedback of said feedback circuit, disconnecting said control electrode means and said one principal electrode from said control circuit, connecting said control electrode means and said one principal electrode to said supply means to impress said calibrating potential between said control electrode means and said one principal electrode, connecting said control electrode means and said one principal electrode and said output of said period amplifier in a feedback circuit such that a control potential is impressed between said control electrode means and said one principal electrode, setting the output potential of said period amplifier at a predetermined magnitude, and measuring the time interval taken by the output potential of said log-level amplifier to reach a predetermined magnitude with the said output potential of said period amplifier set at said magnitude.

6. Apparatus for determining the state of a nuclear reactor comprising means for measuring the neutron flux of said reactor, a valve having an anode, a cathode, a first control electrode, and a second control electrode, means connecting said measuring means to said first control electrode and said cathode, said valve having the property that with said measuring means so connected the resulting potential between said first control electrode and said cathode is substantially proportional to the logarithm of the neutron flux substantially over the whole range of flux over which said reactor operates, first saturable reactor means including control winding means and output winding means, means connecting said anode and cathode in circuit with said control winding means so that the current conducted by said output winding means is dependent on the current conducted between said anode and cathode, negative feedback means connected between said output winding means and said second control electrode, a differentiating network, second saturable reactor means including control winding means and output winding means, means including said network for connecting said output winding means of said first reactor means in circuit with said control winding means of said second reactor means so that the current conducted by the output winding means of said second reactor means depends on the rate of change of current conducted by said output winding means of said first reactor means, and negative feedback means connected between the output winding means of said second reactor means and the control winding means of said second reactor means.

7. Apparatus for determining the state of a nuclear reactor comprising means for measuring the neutron flux of said reactor, a valve having an anode, a cathode, a first control electrode, and a second control electrode, means connecting said measuring means to said first control electrode and said cathode, said valve having the property that with said measuring means so connected the resulting potential between said first control electrode and said cathode is substantially proportional to the logarithm of the neutron flux substantially over the whole range of flux over which said reactor operates, first saturable reactor means including control winding means and output winding means, means connecting said anode and cathode in circuit with said control winding means so that the current conducted by said output winding means is dependent on the current conducted between said anode and cathode, negative feedback means connected between said output winding means and said second control electrode, a differentiating network, second saturable reactor means including control winding means and output winding means, means including said network for connecting said output winding means of said first reactor means in circuit with said control winding means of said second reactor means so that the current conducted by the output winding means of said second reactor means depends on the rate of change of current conducted by said output winding means of said first reactor means, negative feedback means conneced between the output winding means of said second reactor means and the control winding means of said second reactor means, a calibrating connection to be connected to said first control electrode in the calibrating setting of said apparatus, means, operating as a negative feedback connection when said calibrating connection is connected to said first control electrode, connecting said output winding means of said second reactor means to said calibrating connection, a calibrating potential supply, and switch means connected to said calibrating connection for connecting said supply to said calibrating connection in the calibrating setting of said apparatus.

8. In combination a valve having an anode, a cathode, and control-electrode means, saturable reactor means having control-winding means, output-winding means, and short-circuited winding means, means connected to said control-electrode means for impressing a signal to be amplified on said control-electrode means, means connecting said anode and cathode to said control-winding means, and a feedback connection between said output-winding means and said control-electrode means.

9. In combination a valve having an anode, a cathode, a control grid, and a screen grid, saturable reactor means having control-winding means, output-winding means, and short-circuited winding means, means connected to said control grid for impressing a signal to be amplified on said control grid, means connecting said anode and cathode to said control-winding means, and a feedback connection between said output-winding means and said screen grid.

10. In combination a first amplifier having a control circuit and an output circuit, a second amplifier having a control circuit and an output circuit, a capacitor coupling said output circuit of said first amplifier and said control circuit of said second amplifier, means actuable to impress a negative feedback potential between said output circuit of said second amplifier and said input circuit of said first amplifier, means actuable to impress an abrupt signal on said control circuit of said first amplifier, and selectively actuable means for actuating said feedback impressing means and said signal impressing means.

11. In combination a first amplifier having input and output terminals, a second amplifier having input and output terminals, capacitive means coupling said output terminals of said first amplifier and said input terminals of said second amplifier, a first negative feedback connection between said output terminals of said second amplifier and said input terminals of said second amplifier, said feedback connection including impedance means for setting the rate of charging of said capacitive means, and a second negative feedback connection between said output terminals of said second amplifier and said input terminals of said first amplifier, said second connection including impedance means for setting the output of said second amplifier.

12. In combination a first amplifier having input and output terminals, a second amplifier having input and output terminals, capacitive means coupling said output terminals of said first amplifier and said input terminals of said second amplifier, a first negative feedback connection between said output terminals of said second amplifier and said input terminals of said second amplifier, and a second negative feedback connection between said output terminals of said second amplifier and said input terminals of said first amplifier.

13. In combination a first amplifier having input and output terminals, a second amplifier having input and output terminals, capacitive means coupling said output terminals of said first amplifier and said input terminals of said second amplifier, a first negative feedback connection between said output terminals of said second amplifier and said input terminals of said second amplifier, said feedback connection including impedance means for setting the rate of charging of said capacitive means, a second negative feedback connection between said output terminals of said second amplifier and said input terminals of said first amplifier, said second connection including impedance means for setting the output of said second amplifier, a third negative feedback connection between said output and input terminals of said first amplifier, and selectively actuable switch means connected to said second and third connections for suppressing said second connection and rendering said third connection effective or for suppressing said third connection and rendering said second connection effective.

14. In combination a first amplifier having input and output terminals, a second amplifier having input and output terminals, capacitive means coupling said output terminals of said first amplifier and said input terminals of said second amplifier, a first negative feedback connection between said output terminals of said second amplifier and said input terminals of said second amplifier, said feedback connection including impedance means for setting the rate of charging of said capacitive means, a second negative feedback connection between said output terminals of said second amplifier and said input terminals of said first amplifier, said second connection including impedance means for setting the output of said second amplifier, and timing means connected to said second connections for repeatedly rendering said second connections effective to impress negative feedback and suppressing the negative feedback of said second connections during predetermined successive time intervals.

15. In combination a log-level amplifier including a valve having principal electrodes and a control electrode and also having an output circuit, means connected to said control electrode for impressing a signal between said control electrode and one of said principal electrodes, potential supply means including a hot terminal and a ground terminal, a period amplifier having an input circuit and an output circuit, said output circuit of said period amplifier being connected to said ground terminal, a differentiating network, first means connecting in series said output circuit of said log-level amplifier, said network and said output circuit of said period amplifier, second means connecting said network to said input circuit of said second amplifier, said first means including first variable impedance means, second variable impedance means connecting said one principal electrode to said output circuit of said period amplifier, and means connecting said one principal electrode to said hot terminal.

16. In combination a log-level amplifier including a valve having principal electrodes and a control electrode, and also having an output circuit, means connected to said control electrode for impressing a signal between said control electrode and one of said principal electrodes, potential supply means including a hot terminal and a ground terminal, a period amplifier having an input circuit and an output circuit, means connecting said output circuit of said period amplifier to said ground terminal, a differentiating network, first means connecting in series said output circuit of said log-level amplifier, said network and said output circuit of said period amplifier, second means connecting said network to said input circuit of said period amplifier, said first means including first variable impedance means, second variable impedance means connecting said one principal electrode to said output circuit of said period amplifier, means connecting said one principal electrode to said hot terminal, and switch means connected to said one principal electrode for selectively connecting said one principal electrode to said ground terminal or disconnecting said one electrode from said ground terminal, said first variable impedance means to be set so as to maintain the feedback potential from said output circuit of said period amplifier at a magnitude such that the potential of said input circuit relative to said ground terminal is maintained substantially constant and said second variable impedance to be set so that with said switch means disconnecting said one principal electrode from ground said one principal electrode is maintained at a predetermined potential with respect to said ground terminal.

17. In combination a first amplifier having input and output terminals, a second amplifier having input and output terminals, a differentiating circuit means connecting the output terminal of the first amplifier and the input terminal of the second amplifier through said differentiating circuit so that the output of the second amplifier is substantially equal to the differential of the input to the first amplifier, an integrating circuit, and means connecting the output terminal of the second amplifier and the input terminal of the first amplifier through said integrating circuit so that the output of the first amplifier is substantially equal to the integral of the output of the second amplifier.

18. In combination a first amplifier having input and output terminals, a second amplifier having input and output terminals, means connecting the output terminal of the first amplifier and the input terminal of the second amplifier in a differentiating circuit so that the output of the second amplifier is substantially equal to the differential of the input to the first amplifier. and means connecting the output terminal of the second amplifier and the input terminal of the first amplifier in an integrating circuit so that the output of the first amplifier is substantially equal to the integral of the output of the second amplifier, said integrating circuit including first selectively operable means for setting the output of said second amplifier and said differentiating circuit including second selectively operable means for setting the time interval over which the output of said second amplifier is integrated, said first and second means being operable to perform their functions independently of each other.

19. Apparatus for determining the state of a nuclear reactor comprising means for measuring the neutron flux in said reactor, calibrating-potential supply means, a log-level amplifier means connected to said measuring means for producing an output substantially proportional to the logarithm of the output of said measuring means, said amplifier means including valve means having principal electrodes and a control electrode and also including selectively operable switch means having an operating setting and a calibrating setting for connecting said measuring means to said control electrode and one of said principal electrodes to impress a voltage signal substantially proportional to the logarithm of the output of said measuring means between said control electrode and said one principal electrode in said operating setting to provide an operating setting of said apparatus and for impressing the potential of said calibrating-potential supply means between said control electrode and said one principal electrode in said calibrating setting to provide a calibrating setting of said apparatus, a period amplifier means having output impedance means, and feedback means connecting said impedance means to said control electrode and said one principal electrode to maintain the potential between said control electrode and said one principal electrode constant throughout a calibrating operation when said switch means is in said calibrating setting.

20. In combination a first amplifier having an input terminal and an output terminal, a second amplifier having an input terminal and an output terminal, a differentiating network, means connecting said network in signal differentiating relationship between said output terminal of said first amplifier and said input terminal of said second amplifier so that the output of said second amplifier is the differential of the output of said first amplifier, means connected to the input terminal of said first amplifier for producing a variation in the potential at the output terminal of said first amplifier, and negative feedback means between the output terminal of said second amplifier and said first amplifier for compensating for said variation.

21. In combination a first amplifier having an input terminal and an output terminal, a second amplifier having an input terminal and an output terminal, a differentiating network, means connecting said network in signal differentiating relationship between said output terminal of said first amplifier and said input terminal of said second amplifier so that the output of said second amplifier is the differential of the output of said first amplifier, means connected to the input terminal of said first amplifier for producing an abrupt variation in the potential at the input terminal of said first amplifier to produce a variation in the potential at the output terminal of said first amplifier, and negative feedback means between the output terminal of said second amplifier and said first amplifier for compensating for said variation.

22. In combination a first amplifier having input and output terminals, a second amplifier having input and output terminals, capacitive means coupling said output terminals of said first amplifier and said input terminals of said second amplifier, a first negative feedback connection from said output terminals of said second amplifier to the junction of said capacitive means and said input terminals of said second amplifier, and a second negative feedback connection between said output terminals of said second amplifier and said input terminals of said first amplifier.

23. In combination a first amplifier having input and output terminals, a second amplifier having input and output terminals, said input terminals of said first amplifier being electrically isolated from said input terminals of said second amplifier, capacitive means coupling said output terminals of said first amplifier to said input terminals of said second amplifier, a first negative feedback connection between said output terminals of said second amplifier and said input terminals of said second amplifier, and a second negative feedback connection between said output terminals of said second amplifier and said input terminals of said first amplifier.

References Cited in the file of this patent

UNITED STATES PATENTS

| | | |
|---|---|---|
| 2,272,235 | Boucke | Feb. 10, 1942 |
| 2,551,619 | McWhirter et al. | May 8, 1951 |
| 2,744,168 | Gilbert | May 1, 1956 |
| 2,818,504 | De Shong | Dec. 31, 1957 |

OTHER REFERENCES

Electronic Instruments, Radiation Laboratory Series, vol. 21, McGraw-Hill, 1948, pages 65–70.

Instrumentation and Control of the Brookhaven Nuclear Reactor, IRE Transactions on Nuclear Science, vol. NS–1, No. 1, September 1954, page 6.